Inventors:
Albert W. Wigglesworth
Elwood R. Mons
By Bertha L. MacGregor
Attorney Patented Mar. 14, 1944

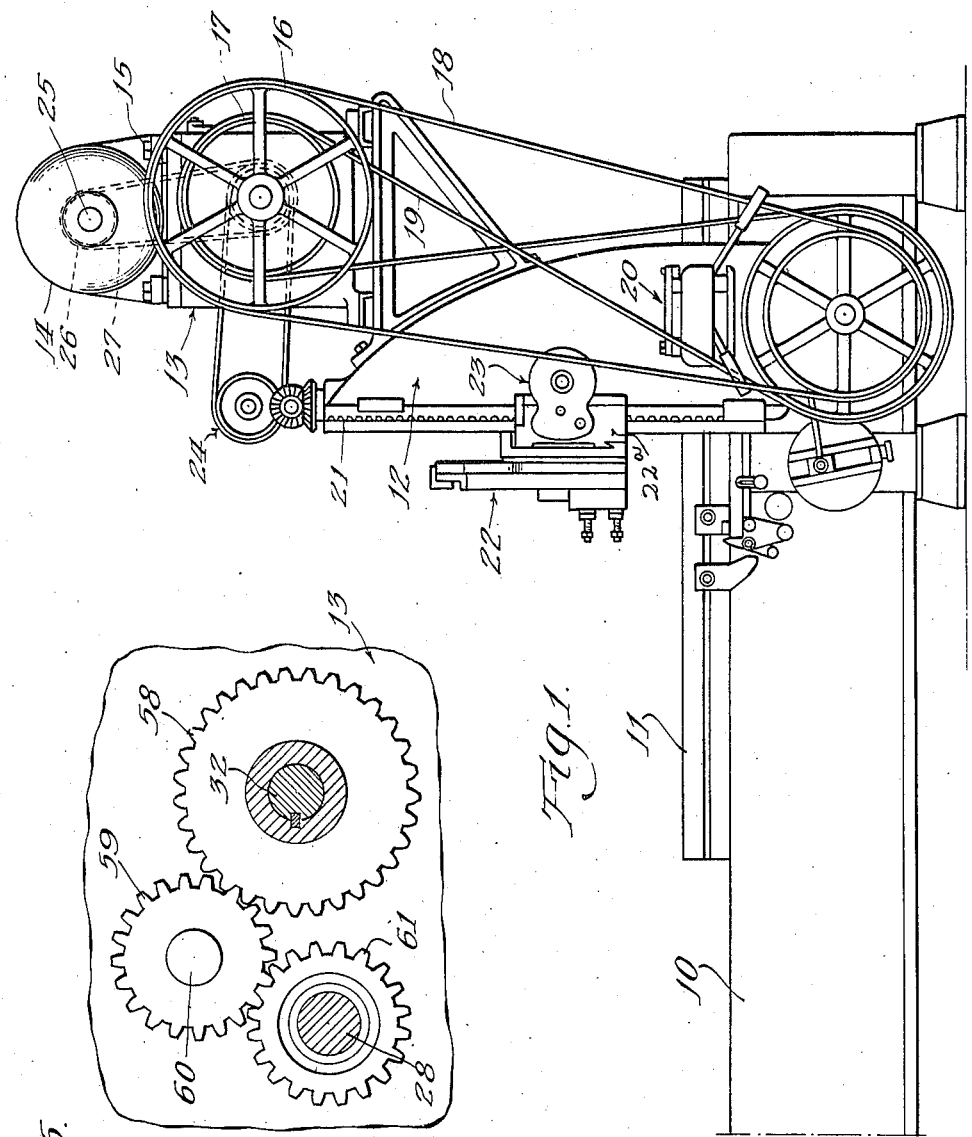

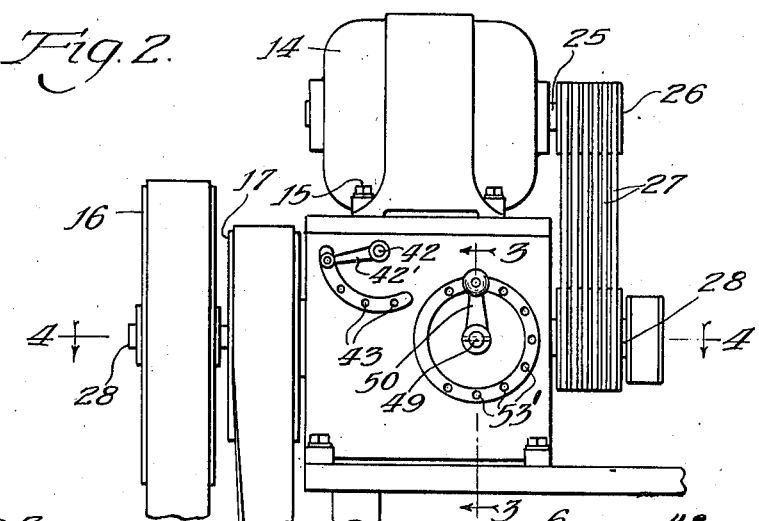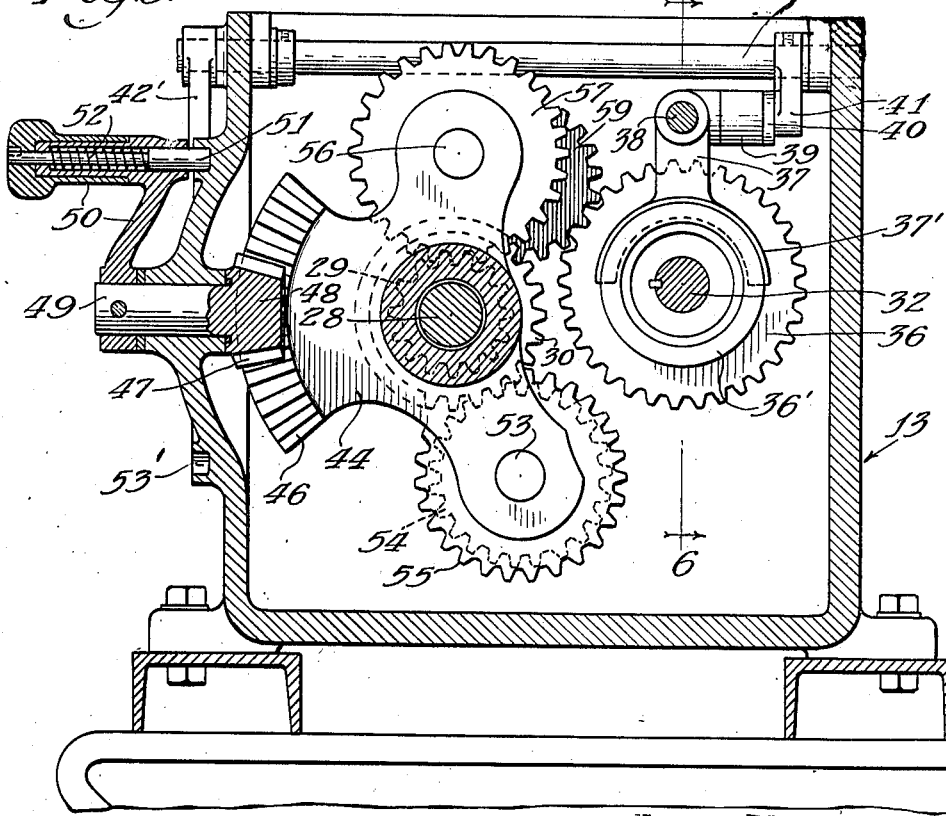

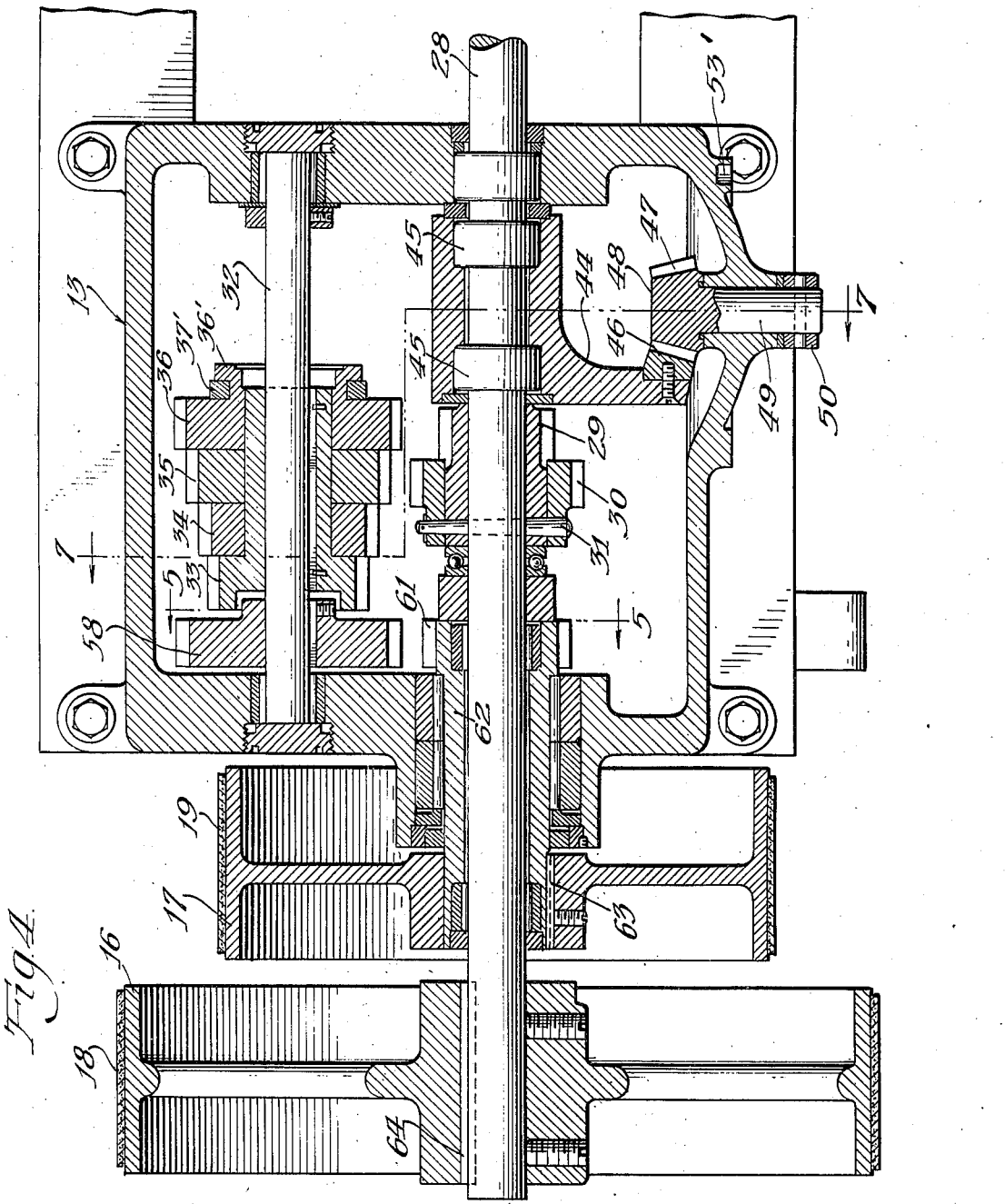

2,344,434

UNITED STATES PATENT OFFICE 2,344,434

VARIABLE SPEED MECHANISM FOR MACHINE TOOLS

Albert W. Wigglesworth, Miami Beach, Fla., and Elwood R. Mons, Chicago, Ill., assignors to Hill-Clarke Machinery Co., Chicago, Ill., a corporation of Illinois Application June 26, 1942, Serial No. 448,582

6 Claims. (Cl. 90—48)

This invention relates to variable speed driving mechanism for planers and other machine tools. It is especially adapted to be interposed between a constant speed motor driven shaft and a driven member the speed of which is to be varied.

In the embodiment of the invention shown in the drawings, the variable speed driving mechanism is in combination with planer mechanism, wherein it is desirable to reciprocate the work table, in one direction at high, constant speed, and in the other direction at variable and lower speeds.

One of the objects of the invention is to provide motor driven, variable speed driving mechanism of the character described, extremely compact in structure, in which the motor driven constant speed shaft and the variable speed driven member are concentric, and each is adapted to be connected to one of two co-axially arranged members, said members being operatively connected to a work table for reciprocating the table, or operatively connected to a tool, work holder or other machine part to be actuated.

Another object is to provide efficient and easily operable means for selecting a speed and adjusting the mechanism to operate at one of a plurality (preferably eight) of speeds.

Other objects and advantages of the invention will be apparent from the following description.

In the drawings:

Figure 1 is a side elevation of a machine tool, such as a planer, embodying our invention.

Figure 2 is an end elevation of the upper right hand portion of the machine as shown in Figure 1, showing the motor, gear housing and controls of our invention.

Figure 3 is a vertical sectional view, on an enlarged scale, taken in the plane of the line 3—3 of Figure 2, looking in the direction indicated by the arrows.

Figure 4 is a horizontal sectional view taken in the plane of the line 4—4 of Figure 2, looking downwardly as indicated by the arrows.

Figure 5 is a vertical sectional view taken in the plane of the line 5—5 of Figure 4.

Figure 6:
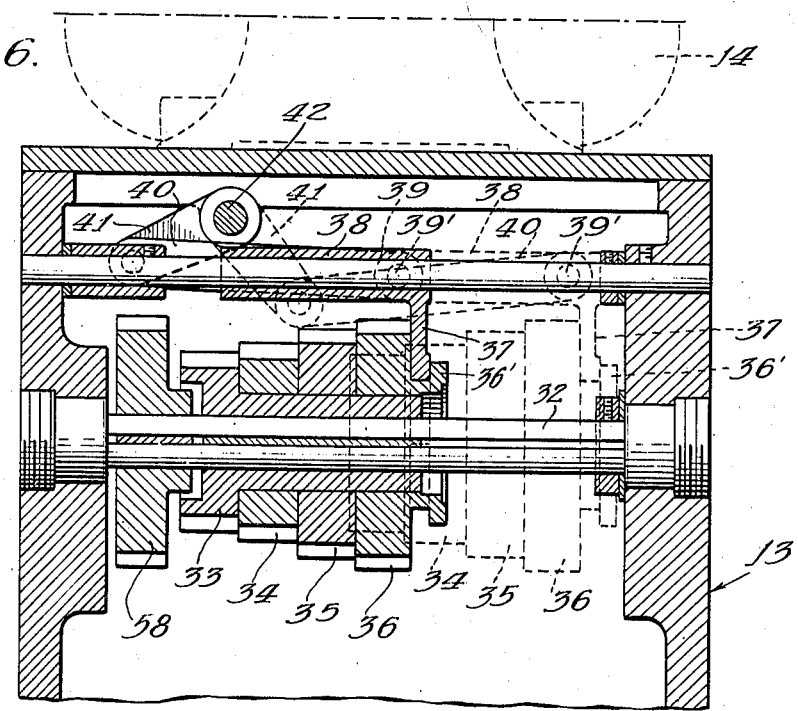
Figure 6 is a vertical sectional view taken in the plane of the line 6—6 of Figure 3.

In that embodiment of the invention shown in the drawings, 10 indicates the base or bed of a planer and 11 the reciprocable work table supported on the bed 10. The superstructure, indicated as a whole at 12, supports the gear housing 13 and motor 14 bolted to the gear housing at 15. Pulleys 16 and 17, respectively, to be referred to later, are operatively connected by belts 18 and 19 to mechanism for reciprocating the work table 11, the means for automatically reversing the direction of travel of the table being indicated as a whole at 20. A rack 21 has mounted thereon a tool holder 22 and adjusting means 23. 24 indicates means for providing power to raise and lower the support 22a carrying the tool holder 22.

Referring now more particularly to Figs. 2 to 7, inclusive, in which are shown the parts which comprise our invention, the motor shaft 25 has mounted thereon a pulley 26 operatively connected by belts 27 to another pulley on the constant speed shaft 28, on the opposite end of which is mounted the pulley 16. The shaft 28 has fixed to it gears 29 and 30 of different diameters, said gears being keyed to the shaft 28 by the pin 31, as shown in Fig. 4.

A shaft 32, parallel to the shaft 28, is rotatable in the gear housing 13. The shaft 32 is a splined shaft and has mounted thereon a plurality of spur gears, in this embodiment four in number, indicated at 33, 34, 35 and 36; the gear 33 having an integral sleeve-like extension on which the gears 34, 35 and 36 are mounted, thereby forming a change-speed unit which is slidable longitudinally of the shaft 32 and rotatable therewith. The gear 36 has an annularly recessed portion 36' on its outer face, providing an annular groove adapted to receive the curved end members 37' of a fork 37, best shown in Figs. 3, 4 and 6, for moving the change-speed unit on the shaft 32. The fork 37 is part of a sleeve 38, connected to a boss 39 on link 40, which rocks on the pin 39' mounted in the bell crank lever 41, one end of which is fixed to the shaft 42. The shaft 42 extends through the gear housing 13 and has on its outer end a handle 42'. Manual adjustment of the handle 42' relatively to the recesses 43 in the gear housing wall, as shown in Figure 2, transmits movement to the fork 37 and thereby to the change-speed gear unit, sliding the gears 33, 34, 35 and 36 on said splined shaft 32, as shown in Fig. 6.

Figure 7:
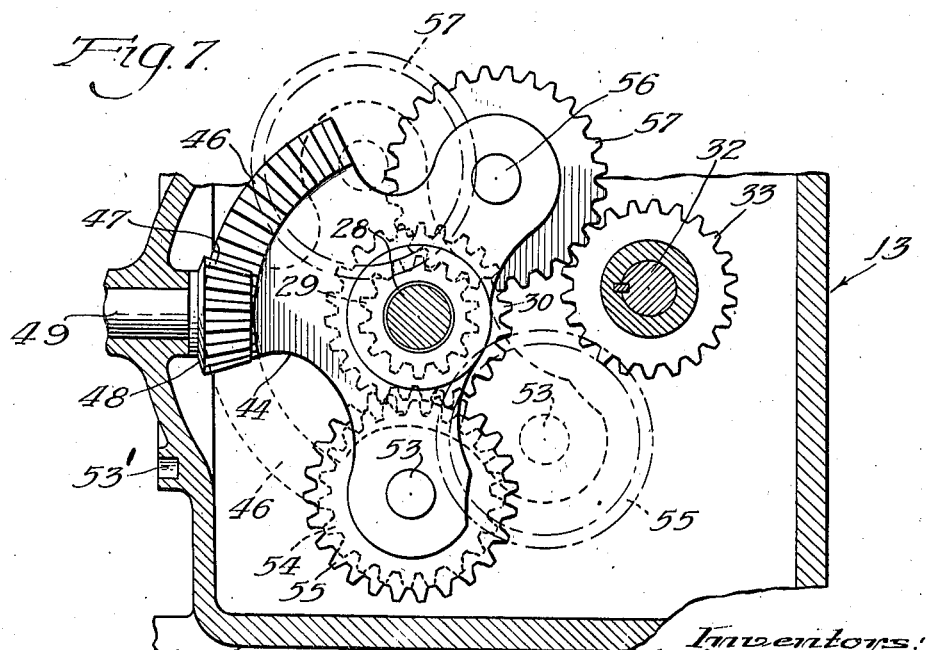
Figure 7 is a vertical sectional view taken in the plane of the line 7—7 of Figure 4.

A quadrant or rocker member 44, best shown in Figures 3, 4 and 7, is mounted on bearings 45 on the constant speed shaft 28. The quadrant 44 has bevel teeth 46 adapted to be engaged by the teeth 47 of a bevel gear 48 fixed on a shaft 49 which extends through the gear housing 13 and has on its outer end a handle 50 one part of which has a bore parallel to the shaft 49, said bore containing a plunger 51 and coiled spring 52. The plunger 51 is adapted to enter one of a plurality of recesses 53' on the outside of the gear housing, as shown in Figures 2 and 3. The handle 50, being pinned to the shaft 49, rotates said shaft when said handle is actuated, thereby rocking the quadrant 44 on the shaft 28 on which it is loosely mounted.

The quadrant or rocker member 44 has two arms, each arm having fixed therein a stub shaft. On one of the stub shafts, 53, is mounted a two gear unit, the gears 54 and 55 of the unit being of different diameters. On the other stub shaft, 56, is mounted a gear 57. The gears 54—55 and 57 are loosely mounted on their respective stub shafts, the gear 54 being constantly in mesh with the gear 30 on shaft 28 and the gear 57 being constantly in mesh with the gear 29 on said shaft 28. One of the two gears 55 and 57 is adapted to mesh with one of the gears 33, 34, 35 and 36 of the change-speed unit, when the rocker member 44 is in one of its two operative positions, as shown in Fig. 7. As there shown in full lines, the rocker arm 44 has been manually set by means of the handle 50 so that the gear 57 meshes with one of the change-speed gears 33. As indicated in dotted lines, when the rocker member 44 is rocked downwardly by means of the handle 50, shaft 49 and teeth 46, 47, the gear 55 will mesh with said change-speed gear 33. In Figure 3, the handle 50 is shown in neutral position, whereby the quadrant or rocker member 44 is held on the shaft 28 in such position that neither of said gears 55, 57 can mesh with any of the change-speed gears 33, 34, 35, 36. In this position, said change-speed gears can be moved longitudinally of their shaft 32 without interference by said gears 55, 57, on the rocker member. After the change-speed gear unit has been moved to place a selected gear opposite the gears of the rocker member 44, said rocker member is moved from neutral position to a position wherein either the gear 55 or the gear 57 meshes with the selected change-speed gear. Thus if four change speed gears such as the gears 33, 34, 35, 36, are provided, to be engaged by one of the two gears 55, 57, eight different speeds may be imparted to the shaft 32, power being transmitted from the constant speed motor shaft 28 through gear 30 to rocker member idler gear 54—55 to a selected one of the change-speed gears 33, 34, 35, 36, or from the shaft 28 through gear 29 to rocker member idler gear 57 to a selected one of the said change-speed gears 33, 34, 35, 36.

On said variable speed shaft 32 is keyed a gear 58 which meshes with an idler gear 59 on stub shaft 60, said idler gear 59 engaging the gear 61 which is integral with a sleeve shaft 62 loose on the shaft 28 and concentric therewith. The pulley 17 is keyed at 63 on said sleeve 62 and the pulley 16 is keyed at 64 to said shaft 28, one of said pulleys, in this case the pulley 16, being operatively connected to the means for moving the work table on its "return" stroke, that is, the constant, high speed movement which is desirable when the table is returning the work to initial position preparatory to starting the forward movement of the work toward the tool; and the other of said pulleys, namely, the pulley 17, being operatively connected to the means for moving the work table on its "forward" stroke, that is, the variable selected speed movement which is desirable when the table is carrying the work to and across the tool.

It will be understood from the foregoing that while the shaft 28 is being driven by the motor at a constant and preferably high speed, which said shaft 28 imparts to the pulley 16, said shaft 28 transmits variable, selected speeds to the sleeve shaft 62 on said shaft 28, and to the pulley 17 on said sleeve shaft 62.

The operator manipulates the handle 50 to move the rocker member 44 to neutral position as shown in Figure 3, then manipulates the handle 42' to move the change-speed unit (gears 33, 34, 35, 36) to desired speed position, then again manipulates handle 50 to move the rocker member 44 to a position wherein either the gear 55 or 57 meshes with one of the change-speed gears, depending on the speed desired for the sleeve shaft 62 and pulley 17 which control the "forward" movement of the work table 11. Thus variable, selected speed movement is imparted to the driven member from the constant speed shaft 28, and reciprocating movement is imparted to the work table at constant speed in one direction and variable speed in the other direction.

Changes may be made in details of construction without departing from the scope of our invention.

We claim:

1. In planers and other machine tools having a reciprocatable work table, a gearing housing, a constant speed motor driven shaft rotatably mounted in the housing, a shaft sleeved on the constant speed shaft, independent gears carried by said constant speed shaft and said sleeve shaft selective variable speed gearing mounted within the casing between the gears on said shafts for transmitting variable speed to said sleeve shaft when said constant speed shaft is rotated, manually adjustable means on the gear housing for moving said variable speed gearing into and out of mesh with the gears on said shafts for controlling the speed of said sleeve shaft, and independently operable means carried by each of said shafts beyond one end of the housing and connected to the work table for moving it in one direction at constant speed and in the reverse direction at one of a plurality of selected speeds.

2. Variable speed mechanism for planers and other machine tools, comprising in combination with a reciprocable work table, a gear housing, a constant speed motor driven shaft rotatably mounted in the housing, a shaft sleeved on the constant speed shaft, variable speed gearing mounted within the housing between said constant speed shaft and said sleeve shaft for transmitting variable speed to said sleeve shaft when said constant speed shaft is rotated, manually adjustable means on the gear housing for adjusting the position of said gearing to operatively engage both of the shafts and produce a selected speed of the sleeve shaft, operative connections between the constant speed shaft and the work table for moving the table in one direction at constant speed, and operative connections between the variable speed sleeve shaft and the work table for moving the table in the reverse direction at one of a plurality of selected speeds.

3. The construction set forth in claim 2, in which there is embodied operable means on the gear housing for moving part of said gearing to neutral position to permit operation of the manually adjustable means for controlling the speed of the sleeve shaft.

4. The construction set forth in claim 2, in which the operative connections between the constant speed shaft and the work table and between the sleeve shaft and the work table each include a pulley connected to each of said shafts.

5. Variable speed mechanism for planers and other machine tools, comprising in combination with a reciprocable work table, a gear housing, a motor mounted on the housing, a constant speed shaft rotatably mounted in the housing and driven by said motor, a second shaft rotatably mounted in said housing, change-speed gears slidably mounted on said second shaft to rotate therewith, manually operable means on the gear housing for moving said change-speed gears on said second shaft to one of a plurality of positions, a shaft sleeved on said constant speed shaft, gearing between said constant speed shaft and said change speed gears on the second shaft, and between said second shaft and said sleeve shaft for transmitting variable speed rotation to said sleeve shaft from said constant speed shaft, a pulley on each of said constant speed shaft and said sleeve shaft, and operative connections between each of said pulleys and the work table for moving said table in opposite directions at different speeds.

6. Variable speed mechanism as set forth in claim 5, in which the gearing between the constant speed shaft and the change-speed gears on the second shaft includes a rocker member carrying idler gears of different diameters, and manually operable means on the gear housing for moving said rocker member to neutral position while said change speed gears are being moved on their shaft.

ALBERT W. WIGGLESWORTH.
ELWOOD R. MONS.